United States Patent
Tanaka

(10) Patent No.: US 11,435,140 B2
(45) Date of Patent: Sep. 6, 2022

(54) DRYING APPARATUS FOR GRANULAR MATERIALS AND DRYING METHOD FOR GRANULAR MATERIALS

(71) Applicant: MATSUI MFG. CO., LTD., Osaka (JP)

(72) Inventor: Toshiro Tanaka, Osaka (JP)

(73) Assignee: MATSUI MFG. CO., LTD., Osaka (JP)

( * ) Notice: Subject to any disclaimer, the term of this patent is extended or adjusted under 35 U.S.C. 154(b) by 151 days.

(21) Appl. No.: 16/902,802

(22) Filed: Jun. 16, 2020

(65) Prior Publication Data

US 2021/0018262 A1   Jan. 21, 2021

(30) Foreign Application Priority Data

Jul. 17, 2019 (JP) .............................. JP2019-131621

(51) Int. Cl.
| | |
|---|---|
| F26B 3/16 | (2006.01) |
| F26B 15/10 | (2006.01) |
| F26B 17/12 | (2006.01) |
| F26B 21/04 | (2006.01) |
| F26B 21/10 | (2006.01) |
| F26B 25/00 | (2006.01) |

(52) U.S. Cl.
CPC ............... *F26B 3/16* (2013.01); *F26B 15/10* (2013.01); *F26B 17/122* (2013.01); *F26B 21/04* (2013.01); *F26B 21/10* (2013.01); *F26B 25/002* (2013.01)

(58) Field of Classification Search
CPC .......... F26B 3/16; F26B 15/10; F26B 17/122; F26B 21/04; F26B 21/10; F26B 25/002

USPC .......................................................... 34/168
See application file for complete search history.

(56) References Cited

U.S. PATENT DOCUMENTS

| | | | | |
|---|---|---|---|---|
| 4,526,731 A | | 7/1985 | Henderson | |
| 4,900,200 A | * | 2/1990 | Harumoto | B65G 53/26 406/106 |
| 6,564,471 B1 | * | 5/2003 | Sutherland | F26B 5/06 34/284 |
| 6,971,187 B1 | * | 12/2005 | Pikal | F26B 5/06 34/285 |

(Continued)

FOREIGN PATENT DOCUMENTS

| | | |
|---|---|---|
| CN | 108844354 A | 11/2018 |
| EP | 2447027 A1 | 5/2012 |

(Continued)

OTHER PUBLICATIONS https://www.youtube.com/watch?v=03pW0uKh54k (glass transition temperature of polymers) Mar. 2013.*

(Continued)

*Primary Examiner* — Stephen M Gravini
(74) *Attorney, Agent, or Firm* — Muncy, Geissler, Olds & Lowe, P.C.

(57) ABSTRACT

A drying apparatus for granular materials in which granular materials in a drying tank are heated and dried; the drying apparatus includes a moving mechanism to move the granular materials in the drying tank; and a control section to control the moving mechanism so as to move the granular materials in the drying tank upon determining that temperature of the granular materials around a heating portion in the drying tank exceeds a glass transition temperature.

13 Claims, 3 Drawing Sheets

(56) References Cited

U.S. PATENT DOCUMENTS

| | | | |
|---|---|---|---|
| 7,966,746 B2* | 6/2011 | Py | F26B 5/06 34/413 |
| 8,196,312 B2* | 6/2012 | Taguchi | B41C 1/1083 34/443 |
| 8,365,432 B2* | 2/2013 | Morimoto | F26B 5/065 34/287 |
| 8,661,705 B2* | 3/2014 | Hackl | B27N 3/28 34/381 |
| 8,793,895 B2* | 8/2014 | Gasteyer, III | A61P 31/12 34/287 |
| 8,919,007 B2* | 12/2014 | Friess | F26B 5/06 34/90 |
| 9,032,641 B2* | 5/2015 | Eloo | F26B 17/105 34/382 |
| 10,809,002 B2* | 10/2020 | Schuetz | F26B 5/06 |
| 2004/0000069 A1* | 1/2004 | Gurol | B29B 13/065 34/592 |
| 2010/0205821 A1 | 8/2010 | Tada et al. | |
| 2012/0070236 A1 | 3/2012 | Kinoshita | |
| 2021/0018262 A1* | 1/2021 | Tanaka | F26B 17/122 |
| 2021/0263709 A1* | 8/2021 | Tojyo | B29C 45/76 |

FOREIGN PATENT DOCUMENTS

| | | | | |
|---|---|---|---|---|
| EP | 3254039 B1 * | 4/2020 | | F26B 5/06 |
| EP | 3767211 A1 * | 1/2021 | | F26B 3/06 |
| GB | 1381480 A | 1/1975 | | |
| JP | 2003071834 A | 3/2003 | | |
| JP | 2006090661 A | 4/2006 | | |
| JP | 2014079954 A | 5/2014 | | |
| JP | 6667884 B1 * | 3/2020 | | F26B 3/06 |
| JP | 2021017989 A * | 2/2021 | | F26B 3/06 |
| WO | WO-2016125095 A1 * | 8/2016 | | F26B 9/066 |

OTHER PUBLICATIONS

Google search for glass transition temperature, Jan. 2022.*
European Search Report dated Nov. 20, 2020 in EP Application No. 20185510 (8 pages).

* cited by examiner

DRYING APPARATUS FOR GRANULAR MATERIALS AND DRYING METHOD FOR GRANULAR MATERIALS

BACKGROUND OF THE INVENTION

Field of the Invention

The present invention relates to a drying apparatus for granular materials and a drying method for granular materials.

Description of the Related Art

A drying apparatus for granular materials is conventionally known. Such a drying apparatus includes an apparatus to heat and dry granular materials in a drying tank; however, when the granular materials are continuously dried under a static condition in the drying tank for a long time, the granular materials tend to be adhered to each other or blocked.

For example, Patent Document 1 mentioned below discloses a storage apparatus for granular materials in which a material storage tank includes a vertical portion extending downward and constituting a downstream-side end portion of a heated air supply line to supply air heated by a heater and also includes a blow port to blow heated air at a lower end portion of the vertical portion. The storage apparatus for granular materials is configured in such a manner that part of a blow-up pipe is arranged in the vertical portion of the heated air supply line, a lower end portion of the blow-up pipe having a suction port to suck resin pellets, an upper end portion of the blow-up pipe having an injection port to inject resin pellets.

RELATED ART DOCUMENTS

Patent Documents

Patent Document 1: Japanese Unexamined Patent Application Publication No. 2014-79954.

SUMMARY OF THE INVENTION

Problem to be Solved by the Invention

The storage apparatus for granular materials disclosed in Japanese Unexamined Patent Application Publication No. 2014-79954 is configured in such a manner that an open-close valve is opened to introduce compressed air to the blow-up pipe while a drying blower and a heater are operated, and resin pellets are fluidized and heated in the material storage tank. It is possible to inhibit adherence of the resin pellets; however, the resin pellets might be blown upward through the blow-up pipe before being heated by the air blown up from the blow port of the heated air supply line and further improvement is expected.

The present invention is proposed in view of the above-mentioned problems. An object of the present invention is to provide a drying apparatus for granular materials and a drying method for granular materials which are capable of efficiently drying the granular materials while adherence of the granular materials is inhibited.

Means of Solving the Problems

In order to solve the above object, a drying apparatus for granular materials in which granular materials in a drying tank are heated and dried is characterized in that the drying apparatus includes a moving mechanism to move the granular materials in the drying tank, and a control section to control the moving mechanism so as to move the granular materials in the drying tank upon determining that temperature of the granular materials around a heating portion in the drying tank exceeds a glass transition temperature.

In addition, in order to solve the above object, a drying method for granular materials in which granular materials in a drying tank are heated and dried is characterized in that the granular materials in the drying tank are moved by a moving mechanism when temperature of the granular materials around a heating portion in the drying tank exceeds a glass transition temperature.

Effects of the Invention

In the drying apparatus for granular materials and the drying method for granular materials in the embodiments of the present invention configured as above, the granular materials are efficiently dried while inhibiting adherence of the granular materials.

DESCRIPTION OF THE EMBODIMENTS

Figure 1:
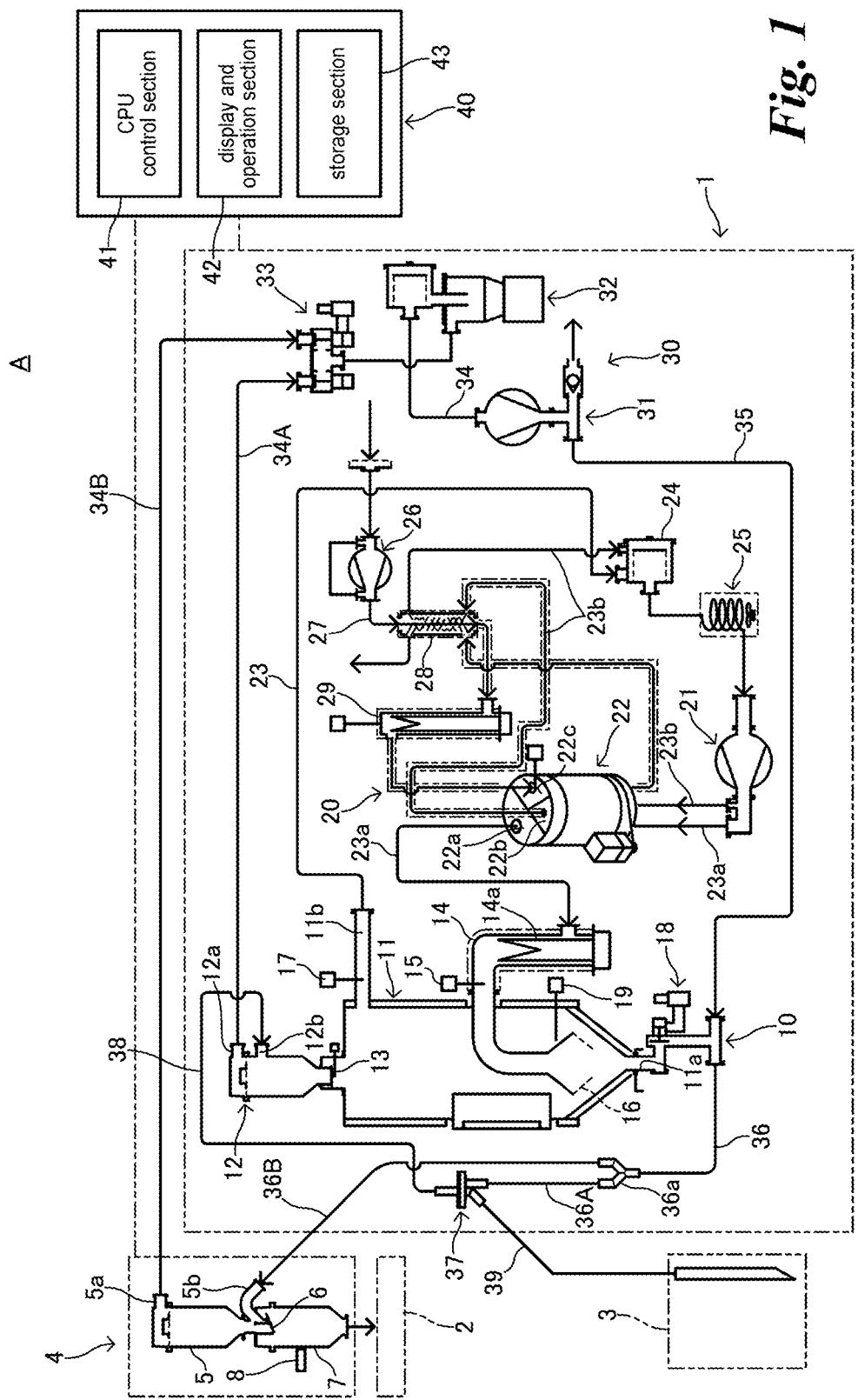
FIG. 1 is a schematic system view diagrammatically illustrating an example of the drying apparatus for granular materials according to an embodiment of the present invention.

An embodiment of the present invention is explained below referring to the drawings.

In FIG. 1, pipes, i.e., piping, which constitute passages and through which the granular materials, gas and the like pass are diagrammatically shown with solid lines.

In the following explanation, the directions such as the vertical direction are explained under a standard condition that the drying apparatus for granular materials of the embodiment is installed.

Figure 2:
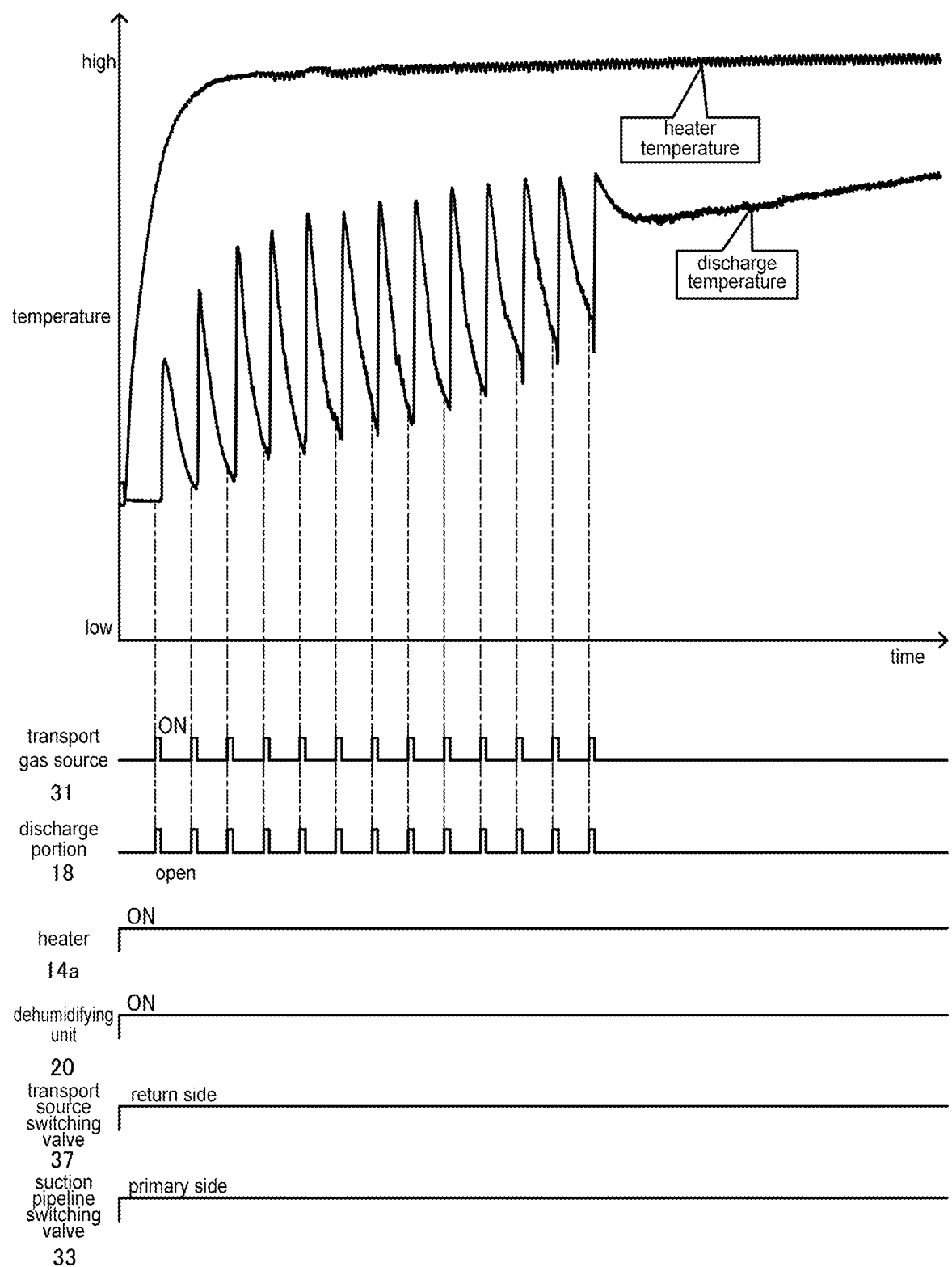
FIG. 2 is a schematic time chart diagrammatically illustrating an example of the drying method for granular materials according to an embodiment of the present invention in which the drying apparatus is applied.
Figure 3:
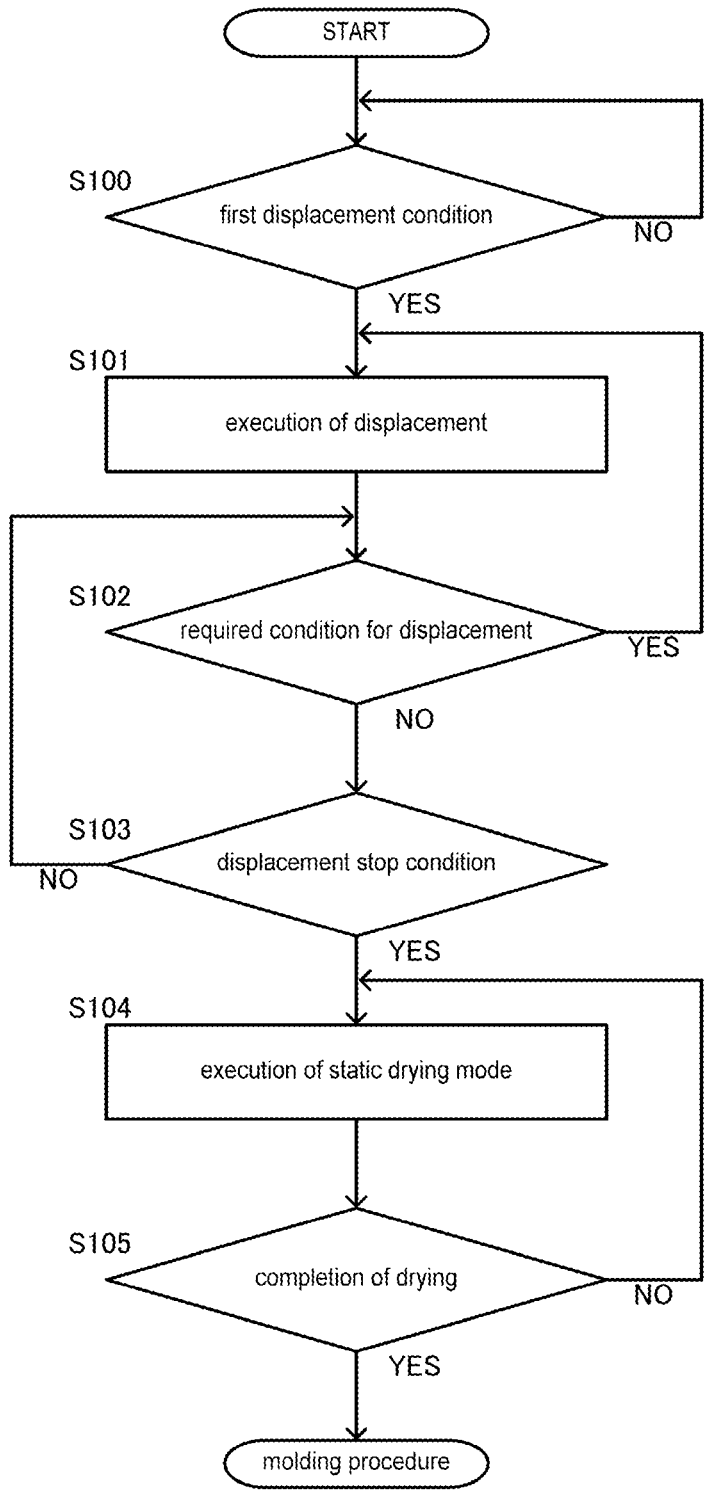
FIG. 3 is a schematic flow chart diagrammatically illustrating an example of the drying method.

FIG. 1 to FIG. 3 are views diagrammatically illustrating an example of the drying apparatus for granular materials according to the embodiment and an example of the drying method for granular materials in which the drying apparatus is applied.

A drying apparatus 1 for granular materials in the embodiment is configured in such a manner that the granular materials in a drying tank 11 are heated and dried as illustrated in FIG. 1.

The above-mentioned granular materials refer to powdered or granular materials and include materials in the form of minute flakes, short fibers, slivers, and so on.

The materials can be any materials such as synthetic resin materials like resin pellets and resin fibers, metal materials, semiconductor materials, woody materials, materials for medicine, and food materials. Granular materials, for example for molding synthetic resin products, include natural materials, i.e., virgin materials, pulverized materials, master batch materials, various kinds of additive agents, and so on. Granular materials can include reinforced fibers such as glass fibers and carbon fibers. The drying apparatus 1 of the embodiment is preferably used for heating materials which tend to be adhered to each other or blocked when being heated in a static condition. Such a material can be biodegradable resin such as polylactic acid or polyglycolic acid; crystalline resin such as polypropylene or polyethylene terephthalate; elastomeric materials; or materials added with various kinds of additive agents.

The drying apparatus 1 has a moving mechanism 30 to move the granular materials in the drying tank 11 and a control section 41 to control the moving mechanism 30 so as to move the granular materials upon determining that the temperature of the granular materials around a heating portion 16 in the drying tank 11 exceeds a glass transition temperature. Specifically, when the granular materials which tend to be adhered to each other are dried, as the gradually increasing temperature of the granular materials heated by the heating portion 16 in the drying tank 11 becomes close to the glass transition temperature, the molecules on the surfaces of the granular materials start moving and the molecules of the adjacent granular materials tend to be entangled and adhered. Further, when the granular materials are further heated under such a condition and are about to be crystallized, the adhered granular materials tend to be hardly separated. In this embodiment, when the temperature of the granular materials around the heating portion 16 exceeds the glass transition temperature which easily causes adherence of the granular materials, the granular materials are moved; the granular materials heated to exceed the glass transition temperature tend to be hardly adhered when the temperature drops thereafter, thereby inhibiting adherence of the granular materials. In such a configuration, the granular materials are more efficiently dried compared with a configuration in which the granular materials are heated while being fluidized from the initial stage of driving, i.e., the initial stage of drying. The granular materials around the heating portion 16 in the drying tank 11 include the granular materials surrounding the heating portion 16 in addition to the granular materials which directly contact or are adjacent to the heating portion 16. The granular materials around the heating portion 16 in the drying tank 11 can be, for example, from 1% to 30% of the granular materials stored in the drying tank 11, or preferably from 1% to 20% or so of the granular materials stored in the drying tank 11.

In the embodiment, the moving mechanism 30 has return passages 36, 36A, 38 to return the granular materials on the lower side in the drying tank 11 to the upper side. In such a configuration, almost all of the granular materials in the drying tank 11 are moved by returning the granular materials on the lower side in the drying tank 11 to the upper side. Thus, the granular materials in the drying tank 11 are more effectively moved compared with, for example, an embodiment in which the moving mechanism 30 is configured with a mechanism to stir the granular materials in the drying tank 11 or is constituted with a gas introduction portion to rapidly increase the pressure in the drying tank 11 by instantaneously introducing gas.

In the embodiment, the return passages 36, 36A, 38 are provided outside the drying tank 11. Such an embodiment simplifies the configuration and the return passages 36, 36A, 38 and the support members for the return passages 36, 36A, 38 do not interrupt the granular materials flowing down in the drying tank 11, compared with an embodiment in which the return passages 36, 36A, 38 are provided inside the drying tank 11.

In the embodiment, one end of the return passages 36, 36A, 38 is connected so as to be communicated with a discharge port 11a at the lower end of the drying tank 11 and the other end of the return passages 36, 36A, 38 is connected to an upper side of the drying tank 11. A branch portion 36a provided in the midway of the return passage 36, 36A, 38 is connected with a downstream-side material transport passage 36B constituting a material transport passage to transport the granular materials to a supply destination 2. In such a configuration, the granular materials discharged from the discharge port 11a at the lower end of the drying tank 11 are returned to the upper side of the drying tank 11 through the return passages 36, 36A, 38 connected so as to be communicated with the discharge port 11a. In addition, the granular materials discharged from the discharge port 11a at the lower end of the drying tank 11 are transported to the supply destination 2 through the branch portion 36a of the return passages 36, 36A, 38 and through the downstream-side material transport passage 36B. The granular materials are moved by being discharged from the discharge port 11a at the lower end of the drying tank 11, so that almost all amount of the granular materials in the drying tank 11 is moved and the configuration of the drying tank 11 is simplified, compared with an embodiment in which the return passages 36, 36A, 38 are connected around the middle of the drying tank 11 in the height direction in addition to the material transport passage.

The supply destination 2 of the granular materials dried in the drying apparatus 1 is, for example, a molding machine such as an injection molding machine. The embodiment exemplifies that the granular materials are pneumatically transported or transported by air to the supply destination 2 from a discharge portion 18 provided on the lower side of the drying tank 11. In addition, a collection device 4 to collect the granular materials pneumatically transported from the drying tank 11 is provided on the upstream side of the supply destination 2. The collection device 4 can constitute a drying system A together with the drying apparatus 1. The drying tank 11 of the drying apparatus 1 is not limited to be provided apart from the supply destination 2 and can be directly provided or mounted on the supply destination 2. In such a case, the collection device 4 is not necessarily required. The molding machine constituting the supply destination 2 is not limited to an injection molding machine to mold synthetic resin molded products, it can be an injection molding machine for other materials, or other molding machines such as an extrusion molding machine or a compression molding machine for various kinds of materials. The supply destination 2 of the drying tank 11 is not limited to a molding machine and can be a charge hopper or a blending device on a molding machine. The supply destination 2 of the drying tank 11 is not limited to be a single destination and can have plural destinations.

In the embodiment, an upstream-side supply passage 39 to transport the granular materials from a material source 3 to the drying tank 11 is connected to the midway of the material return passages 36, 36A, 38 through a transport source switching valve 37. In such a configuration, movement or return of the granular materials in the drying tank 11 and supply of the granular materials to the drying tank 11 are selectively executed by switching the transport source switching valve 37.

This embodiment exemplifies that the granular materials are pneumatically transported from the material source 3 to the drying tank 11. A collector 12 to collect the granular materials pneumatically transported from the material source 3 is provided on the upstream side of the drying tank 11. The drying tank 11 and the collector 12 constitute a drying apparatus body 10. A transport gas source 31 is commonly used as a transport gas source driven in a primary transportation in which the granular materials in the material source 3 are pneumatically transported to the collector 12 of the drying apparatus body 10 and as a transport gas source driven in the secondary transportation in which the granular materials in the drying tank 11 are pneumatically transported to the collection device 4 of the supply destination 2. Namely, the primary transportation and the secondary transportation are executed by the single transport gas source 31. The primary transportation and movement or return of the granular materials in the drying tank 11 are executable by the single transport gas source 31.

The return passages 36, 36A, 38 are composed of the upstream-side material transport passage 36 connected to the discharge portion 18, the upstream-side return passage 36A constituting one of the pipelines branched from the upstream-side material transport passage 36 through the branch portion 36a, and the downstream-side return passage 38 connected to the transport source switching valve 37 connected with the upstream-side return passage 36A.

The branch portion 36a has one upstream-side connection portion connected with the downstream-side end portion of the upstream-side material transport passage 36 and two downstream-side connection portions bifurcated from the upstream-side connection portion. The upstream-side end portion of the upstream-side return passage 36A is connected to one of the downstream-side connection portions of the branch portion 36a. The upstream-side end portion of the downstream-side material transport passage 36B is connected to the other of the downstream-side connection portions of the branch portion 36a.

The transport source switching valve 37, not illustrated in detail in the figure, has one downstream-side connection portion connected with the upstream-side end portion of the downstream-side return passage 38, two upstream-side connection portions, and a slide valve to selectively communicate one of two upstream-side connection portions with the one downstream-side connection portion. The slide valve can be driven by any suitable valve driving device such as an air cylinder. The downstream-side end portion of the upstream-side return passage 36A is connected to one of the upstream-side connection portions of the transport source switching valve 37. The downstream-side end portion of the upstream-side supply passage 39 is connected to the other of the upstream-side connection portions of the transport source switching valve 37.

The collection device 4 has storage function to store the collected granular materials, in addition to collection function of the granular materials. The collection device 4 has a collector 5 having an introduction pipe 5b connected with the downstream-side end portion of the downstream-side material transport passage 36B, and has a storage portion 7 to store the granular materials collected in the collector 5.

The introduction pipe 5b of the collector 5 is provided on the lower end side of the collector 5 so as to introduce the granular materials from the lower end side of the collector 5. The figure exemplifies that the introduction pipe 5b is provided so as to project in the radial direction from the side circumference of the discharge pipe provided on the lower end portion of the collector 5 in the form of a hopper.

The collector 5 has a suction pipe 5a connected with the secondary side suction pipeline 34B connected so as to be communicated with the suction side of the transport gas source 31. The figure exemplifies that the suction pipe 5a is provided so as to project in the radial direction from the side circumference of the upper end portion of the collector 5.

The collector 5 has any suitable separation portion to separate the granular materials from the transport gas flowing to the suction pipe 5a. Such a separation portion is only required to separate the granular materials and the transport gas and can be constituted with perforated metal or a net-like member, i.e., a mesh like member, which passes fine dust and the transport gas but does not pass granular materials, i.e., raw materials. In addition, the separation portion can be formed like a conical baffle or can be constituted so as to separate the granular materials from the transport gas in a cyclonic manner, in place of the perforated metal or the net like member. Such a configuration enables the collector 5 to remove fine dust and to mix different kinds of materials while fluidizing the granular materials introduced from the lower side in the collector 5.

The collection device 4 has a valve body 6 to open and close the discharge port of the discharge pipe of the collector 5. The valve body 6 can be oscillatably held like a pendulum by any suitable hanging member. The valve body 6 can be configured so as to close the discharge port by the suction force of the transport gas source 31 and also to be opened by the load of the falling or flowing granular materials. In addition, the valve body 6 can be configured in various ways.

The storage portion 7 is provided under the collector 5 so as to be connected and is formed like a hopper. The figure exemplifies that part of the discharge pipe and the introduction pipe 5b which are provided at the lower end portion of the collector 5 are housed in the storage portion 7; however, the embodiment is not limited to such an exemplification. The discharge port on the lower end side of the storage portion 7 is airtightly connected to a charge port of the supply destination 2.

The collection device 4 has a material sensor 8 to output material request signals. The figure exemplifies that the material sensor 8 is provided on the side of the circumferential wall portion of the storage portion 7; however, the embodiment is not limited to such an exemplification.

The collector 12 of the drying apparatus body 10 has a suction pipe 12a connected with a primary side suction pipeline 34A which is connected so as to be communicated with the suction side of the transport gas source 31, and an introduction pipe 12b connected with the downstream-side end portion of the downstream-side return passage 38. The figure exemplifies that the suction pipe 12a is provided so as to project in the radial direction from the side circumferential portion of the upper end side region of the collector 12 and the introduction pipe 12b is provided so as to be positioned on the lower side of the suction pipe 12a and to project in the radial direction from the side circumferential portion of the upper end side region of the collector 12; however, the embodiment is not limited to such an exemplification.

The collector 12 has any suitable separation portion to separate the granular materials from the transport gas flowing to the suction pipe 12a, roughly the same as the collector 5 of the collection device 4 mentioned above.

The drying apparatus body 10 has a valve body 13 to open and close the discharge port of the discharge pipe of the collector 12. The valve body 13 can be oscillatably held like a pendulum by any suitable hanging member, the same as mentioned above. The figure exemplifies that the valve body 13 is rotatable around the axis along the horizontal direction and has a weight for rotating the valve body 13 to a closing side.

The valve body 13 can be configured so as to close the discharge port by the weight and the suction force of the transport gas source 31 and to be opened by the load of the falling or flowing granular materials, roughly the same as the valve body 6 of the collector 5.

The primary-side suction pipeline 34A and the secondary-side suction pipeline 34B are connected so as to be communicated with a suction pipeline 34 connected to the suction side of the transport gas source 31 through a suction pipeline switching valve 33. When the suction pipeline switching valve 33 is switched to one side, i.e., the primary side, the suction pipeline 34 and the primary-side suction pipeline 34A are communicated. Under such a condition, when the transport source switching valve 37 is switched to one side, i.e., the movement side or the return side, the discharge portion 18 of the drying apparatus body 10 is connected so as to be communicated with the collector 12 through the upstream-side material transport passage 36, the upstream-side return passage 36A and the downstream-side return passage 38, thus enabling pneumatic transportation or returning of the granular materials to the collector 12 from the drying tank 11. When the transport source switching valve 37 is switched to the other side, i.e., the supply side, with the suction pipeline switching valve 33 switched to the one side, i.e., the primary side, the material source 3 is connected so as to be communicated with the collector 12 through the upstream-side supply passage 39 and the downstream-side return passage 38, thus enabling pneumatic transportation or supply of the granular materials from the material source 3 to the collector 12.

When the suction pipeline switching valve 33 is switched to the other side, i.e., the secondary side, the suction pipeline 34 and the secondary-side suction pipeline 34B are communicated, thus enabling pneumatic transportation of the granular materials from the drying tank 11 to the collector 5 of the collection device 4. The figure exemplifies that a filter unit 32 to catch fine dust and the like is provided for the suction pipeline 34 between the suction pipeline switching valve 33 and the transport gas source 31. The transport gas source 31 constituting the moving mechanism 30 can be any suitable blower, i.e., an air blower, or the like.

The figure exemplifies that the discharge side of the transport gas source 31 is connected with a return pipeline 35 to be communicated with the upstream-side material transport passage 36 connected to the discharge portion 18 of the drying apparatus body 10. Namely, the discharge side of the transport gas source 31 is configured to be communicated with the upstream-side end portion of the upstream-side material transport passage 36 without opening into the atmospheres. By such a configuration, the discharge portion 18 of the drying tank 11, and the collector 5 of the collection device 4 or the collector 12 of the drying apparatus body 10 are connected and communicated in a manner of an approximately closed loop through the pipelines and the passages 34A, 34B, 34, 35, 36, 36A, 36B, 38, thereby inhibiting intrusion of outside air, i.e., atmosphere, into the loop. Inert gases such as nitrogen can be supplied to the circulation route connected and communicated in an approximately closed loop manner.

The figure exemplifies that an exhaust portion to exhaust excess gas to the discharge side of the transport gas source 31 is provided. The material source 3 can be in the shape of a tank, a hopper, a drum or the like; the figure exemplifies the material source 3 in the shape of a tank into which a suction nozzle connected to the upstream-side supply passage 39 is inserted. In place of such an example, the material source 3 can be almost airtightly closed. In such a case, the discharge portion similar to the discharge portion 18 of the drying apparatus body 10 can be provided at the lower end portion of the material source 3, the pipeline diverged from the return pipeline 35 and the upstream-side supply passage 39 can be connected so as to be communicated with the discharge portion, and the material source 3 and the collector 12 of the drying apparatus body 10 can be connected and communicated in an approximately closed loop. In such a case, inert gases such as nitrogen can be supplied to the circulation route connected and communicated in the approximately closed loop manner, the same as mentioned above. The embodiment in which the granular materials are transported from the drying tank 11 to the collection device 4 of the supply destination 2 and the embodiment in which the granular materials are transported from the material source 3 to the drying tank 11 are not limited to those mentioned above and various modifications are possible.

The drying tank 11 is in the shape of a hopper in such a manner that the upper region is approximately tubular and the lower region is formed in an approximately inverse conical shape. The collector 12 is provided on the upper end portion of the drying tank 11 so as to receive the discharge pipe. The valve body 13 of the collector 12 is opened or closed in the drying tank 11. The drying tank 11 has any suitable material sensor, not illustrated in the figures, to output material request signals.

The upper end portion of the drying tank 11 is provided with an exhaust pipe 11b which constitutes an exhaust port to exhaust the gas introduced into the drying tank 11 out of the drying tank 11 and which is connected with the upstream-side end portion of a circulation pipeline 23 constituting the circulation passage. The figure exemplifies that the exhaust pipe 11b has a temperature sensor 17 to detect the temperature of the gas exhausted from the drying tank 11.

In this embodiment, the heating portion is a gas outlet 16 on the lower side of the drying tank 11 to blow the gas heated by a heater 14a. By such a configuration, the temperature of the granular materials on the lower side in the drying tank 11 increases more rapidly, for example, compared with the embodiment in which the heater is a heat transmission fin or the like.

The drying tank 11 is attached with a heating unit 14 in the shape of a box having the heater 14a to heat the gas introduced into the drying tank 11. Any suitable insulation material can be provided along the outer circumference of the heating unit 14. A temperature sensor 15 to detect the temperature of the gas passing through the heater 14a is provided on the downstream side of the heater 14a of the heating unit 14. The heater 14a is controlled in such a manner that the heated gas reaches a predetermined temperature based on the temperature detected by the temperature sensor 15.

A vent pipe extending vertically in the drying tank 11 is provided on the downstream side of the heating unit 14. The gas outlet 16, constituting the heating portion, to introduce gas into the drying tank 11 is provided at the lower end portion of the vent pipe. Drying gas exhausted from the gas outlet 16 to the lower end side region in the drying tank 11 passes through the layer of the granular materials stored in the drying tank 11, and is exhausted to the circulation pipeline 23 through the exhaust pipe 11b provided at the upper end portion. The gas outlet 16 to introduce the heated gas into the drying tank 11 and the heating unit 14 are not limited to those mentioned above and various modifications are possible. An insulation material or a band heater to inhibit heat radiation can be provided along the outer circumference side of the drying tank 11.

In this embodiment, the drying apparatus 1 has a dehumidifying unit 20 which is arranged so as to constitute the circulation passage and which dehumidifies the gas exhausted from the drying tank 11 and circulates the dehumidified gas to the heating unit 14.

The dehumidifying unit 20 has an approximately cylindrical dehumidifying rotor 22 which is rotated by a motor or the like, and a gas circulation source 21 such as a blower, i.e., an air blower, provided for the circulation pipeline 23.

The dehumidifying rotor 22, which is not detailed in the figure, can be in the shape of a honeycomb provided with a plurality of gas communication passages penetrating in the axial direction, and can be configured in such a manner that any suitable adsorbent such as synthetic zeolite or silica gel which adsorbs moisture is impregnated or captured in the partition wall constituting the gas communication passage. Both sides in the axial direction of the dehumidifying rotor 22 have cover bodies with partition walls which divide the dehumidifying rotor 22 into a dehumidifying treatment zone 22a, a cooling recycle zone 22b and a heating recycle zone 22c.

A filter 24 to catch fine dust and so on and a cooler 25 to cool gas are provided for the circulation pipeline 23 in this order toward a gas circulation source 21 provided on the downstream side. The cooler 25 can be configured in such a manner that the temperature of the gas passing through the cooler 25 is equal to or less than 80 degrees centigrade, for example, so as not to introduce a gas at high temperature in the gas circulation source 21. The figure exemplifies the cooler 25 of an air-cooling type having a fan to send air to a radiation pipe curved in the shape of a bent pipe like a coil, i.e., a spiral; however, various types of configurations such as a water-cooling type are applicable.

The discharge side of the gas circulation source 21 is connected with a dehumidifying-side pipeline 23a communicated with the dehumidifying treatment zone 22a of the dehumidifying rotor 22 and a cooling-side pipeline 23b communicated with the cooling recycle zone 22b of the dehumidifying rotor 22. The downstream-side end portion of the dehumidifying-side pipeline 23a is connected to the heating unit 14 of the drying tank 11.

The downstream-side end portion of the cooling-side pipeline 23b is connected to the upstream side of the circulation pipeline 23 further than the gas circulation source 21 through a heat exchanger 28 so as to be communicated. The figure exemplifies that the downstream-side end portion of the cooling-side pipeline 23b is connected to the filter 24. An insulation material can be provided along the outer circumference of the region of the cooling-side pipeline 23b from the dehumidifying rotor 22 to the heat exchanger 28.

The heating recycle zone 22c of the dehumidifying rotor 22 is connected with a heating recycle pipeline 27 having a heating portion 29 so as to be communicated. The upstream-side region of the heating recycle pipeline 27 is provided with a recycle gas source 26 to send recycle gas to the heating portion 29. The heating recycle pipeline 27 is connected to the heating portion 29 through the heat exchanger 28. The downstream-side region of the heating recycle pipeline 27 is connected to the heat exchanger 28. The heating recycle gas is designed to be exhausted outside through the heat exchanger 28. An insulation material can be provided along the outer circumferences of the heat exchanger 28 and the heating recycle pipeline 27 including the heating portion 29 on the downstream side further than the heat exchanger 28.

The heat exchanger 28 is configured in such a manner that the temperature of the gas introduced from outside through the recycle gas source 26 is indirectly increased by the gas passing through the cooling recycle zone 22b and the heating recycle zone 22c of the dehumidifying rotor 22.

In the dehumidifying unit 20 configured as above, with detailed explanations omitted here, when the gas circulation source 21, the recycle gas source 26 and the heating portion 29 are operated with the dehumidifying rotor 22 rotated, a gas having a low dew point which passes through the dehumidifying treatment zone 22a of the dehumidifying rotor 22 is continuously supplied into the drying tank 11. In the dehumidifying unit 20, the dehumidifying rotor 22 which adsorbs moisture when a gas having a high dew point passes through the drying tank 11 is heated and recycled in the heating recycle zone 22c and the dehumidifying rotor 22 thus heated is cooled in the cooling recycle zone 22b in order to improve the adsorbing ability. The dehumidifying unit 20 is not limited to be configured as mentioned above and various modifications are possible. Or, an embodiment without such a dehumidifying unit 20 is applicable. In addition, inert gases such as nitrogen can be supplied into the circulation pipeline 23 constituting the circulation passage and into the drying tank 11. The embodiment is not limited to such a configuration that the gas exhausted from the drying tank 11 is returned to the drying tank 11 to be circulated; the gas can be exhausted outside from the drying tank 11. In such a case, the heating unit 14 can be connected with the exhaust side of any suitable gas source.

The discharge portion 18 of the drying tank 11 can be provided with a valve body capable of almost airtightly sealing the downstream side of the discharge portion 18 and the inside of the drying tank 11. Such a valve body can be slid approximately in the orthogonal direction relative to the axial direction of the discharge pipe, can be slid along the axial direction relative to an opening provided for the discharge route, or can be configured in various manners.

The downstream side of the discharge portion 18 has a connection portion connected with the upstream-side material transport passage 36 and a connection portion connected with the return pipeline 35. When the granular materials in the drying tank 11 are transported to the movement side, i.e., the return side, or the side of the supply destination 2 as mentioned above, the discharge portion 18 is opened. Namely, when the transport gas source 31 is driven and the valve body of the discharge portion 18 is opened, the gas returning through the return pipeline 35 is introduced into the upstream-side material transport passage 36, and also the granular materials discharged from the drying tank 11 by the suction force of the transport gas source 31 are pneumatically transported to the collector 12 of the drying apparatus body 10 or to the collector 5 of the collection device 4 through the upstream-side material transport passage 36.

The drying apparatus 1 has a control panel 40 having a control section 41 constituted with a CPU and so on to control the above-mentioned devices or portions, a display and operation section 42, a memory section 43 and so on. The control panel 40 is not limited to be exclusively provided for the drying apparatus 1, can be a control panel provided for the drying system A, or can be provided apart from the drying apparatus 1.

Through a signal line or the like, the control section 41 is connected with devices required for operating the drying apparatus 1, i.e., the drying system A, such as a driving portion to drive the valve body of the discharge portion 18 of the drying apparatus body 10, the material sensor 8, the heater 14a, the temperature sensors 15, 17, the transport gas source 31, the suction pipeline switching valve 33, the transport source switching valve 37, the gas circulation source 21, the recycle gas source 26, the heating portion 29, and the driving portion for rotating the dehumidifying rotor 22. The display and operation section 42 constitutes a display section and an operation section for various settings, input, and display. The memory section 43 is constituted with various memories, and stores the setting conditions and the input values which are set or input by the display and operation section 42, various kinds of programs such as a control program for executing basic operations including a drying method to be mentioned later, various previously set operation conditions, and various kinds of data tables.

The control section 41 is designed to control the moving mechanism 30 and move the granular materials in the drying tank 11 upon determining the first movement condition in which the temperature of the granular materials around the gas outlet 16 constituting the heating portion in the drying tank 11 exceeds the glass transition temperature after the drying apparatus 1 is driven. The first movement condition can be a time duration which is experimentally determined or is previously set depending on the kinds of granular materials, the capacity of the drying tank 11, the preset drying temperature, i.e., the preset temperature of the heater 14a, and so on. Depending on the configuration of the heating portion, the first movement condition can be equal to or less than 10 minutes or from 3 minutes to 7 minutes or so when the heating portion is the gas outlet 16 to blow heated gas, like the embodiment.

It can be configured in such a manner that a temperature sensor 19 to detect the temperature around the gas outlet 16 constituting the heating portion is provided as illustrated in FIG. 1, when the detected value of the temperature sensor 19 exceeds the glass transition temperature, the first movement condition is determined to be satisfied. The figure exemplifies that the temperature sensor 19 is provided on the outer circumferential side of a rectifying portion which is provided adjacent to the upper side of the gas outlet 16 and is enlarged in diameter toward the lower side; however, the embodiment is not limited to such a configuration. When the first movement condition is the time duration as mentioned above, an embodiment without a temperature sensor 19 is applicable.

In the embodiment, when the granular materials are moved, the control section 41 is designed to control the moving mechanism 30 so as to return from 1% to 20% of the stored amount of the granular materials in the drying tank 11 to the upper side through the return passages 36, 36A, 38. In such a configuration, relatively small amount of granular materials is returned from the lower side to the upper side in case of movement and the granular materials are more efficiently dried while inhibiting adherence of the granular materials compared with the embodiment in which a large amount of granular materials is returned to the upper side.

The return amount, i.e., the amount, of the granular materials to be returned to the upper side through the return passages 36, 36A, 38 in case of moving the granular materials can be preferably equal to or less than 10% of the stored amount of the granular materials in the drying tank 11, i.e., the stored amount of the granular materials at a full level in the storage tank 11, or more preferably equal to or less than 5%. Or the open time duration of the valve body of the discharge portion 18 constituting the moving mechanism 30 and the driving time duration of the transport gas source 31 can be suitably set in order that the return amount of the granular materials reaches the above-mentioned amount in case of moving the granular materials in the drying tank 11. Any suitable flow meter or weighing meter can be provided on the downstream side of the discharge portion 18 in order that the return amount of the granular materials reaches the above-mentioned amount in case of moving the granular materials in the drying tank 11.

In the embodiment, the control section 41 is configured to control the moving mechanism 30 to move the granular materials when a predetermined required condition for movement is satisfied after the granular materials are moved by the moving mechanism 30. In such a configuration, the granular materials are moved each time a predetermined required condition for movement is satisfied, so that the granular materials are more effectively inhibited from adhering to each other. This required condition for movement can be the same as, or different from, the above-mentioned first movement condition. For example, the moving mechanism 30 can be controlled to move the granular materials each time a predetermined movement time duration passes after the drying apparatus 1 is driven. The open time duration of the valve body of the discharge portion 18 and the driving time duration of the transport gas source 31 can be suitably preset in order that the return amounts of the granular materials each time the granular materials in the drying tank 11 are moved are almost the same.

The control section 41 is configured to execute a static drying mode in which the granular materials are dried in a static condition when a predetermined movement stop condition is satisfied during the moving and drying mode in which the granular materials are moved by controlling the moving mechanism 30 each time the above-mentioned required condition for movement is satisfied. In such a configuration, under the movement stop condition, the granular materials are dried in a static condition without being moved, so that the granular materials are more efficiently dried while conserving energy, compared with the configuration in which the granular materials are repeatedly moved until the granular materials are capable of being supplied to the supply destination 2.

Such a movement stop condition can be set so as to assume or determine that almost all the granular materials in the drying tank 11 exceed the glass transition temperature at least once. For example, the movement stop condition can be considered to be satisfied when the number of movements exceeds a predetermined value which is experimentally determined in advance. When the decreased value of the exhaust gas temperature which repeatedly increases and decreases at each return transportation, i.e., movement execution, exceeds a predetermined rate, for example, from 40% to 60%, of the preset drying temperature, it can be determined that the movement stop condition is satisfied. Or when the difference between the increased value and the decreased value of the exhaust gas temperature, i.e., the temperature difference, which repeatedly increases and decreases at each return transportation, i.e., movement execution, becomes equal to or less than a predetermined value, it can be determined that the movement stop condition is satisfied. In this case, specifically at the initial stage of driving, the temperature difference tends to be small, so that it can be determined whether the movement stop condition is satisfied after the temperature difference becomes smaller than the temperature difference at the time of previous return transportation, i.e., the movement execution, or after the return transportation, i.e., movement execution, is executed several times. Or it can be configured in such a manner that a temperature sensor to detect the temperatures of a plurality of points from the top to the bottom in the drying tank 11 is provided and it can be determined that the movement stop condition is satisfied when the detected value of the temperature sensor exceeds the glass transition temperature.

The movement stop condition can be set in such a manner that the entire amount of the granular materials to be returned to the upper side of the drying tank 11 from the driving of the drying apparatus 1 until the satisfaction of the movement stop condition becomes less than the stored amount of the granular materials in the drying tank 11, preferably equals to or less than 70% of the stored amount, or more preferably equals to or less than 50% of the stored amount. In such a configuration, the granular materials are more efficiently dried compared with the embodiment in which the entire amount of the granular materials in the drying tank 11 is returned from the lower side to the upper side.

In the movement stop condition, the time duration from the driving of the drying apparatus 1 until the satisfaction of the movement stop condition can be a predetermined drying time duration, for example, equal to or less than half of a recommended drying time duration which is, for example, from two hours to five hours or so, or preferably equal to or less than one third of the recommended drying time duration which is, for example, from two hours to five hours or so. In such a configuration, the granular materials are more efficiently dried compared with the embodiment in which the granular materials are repeatedly moved close to the recommended drying time duration.

The drying method for granular materials in the embodiment using the drying apparatus 1 as mentioned above, is configured in such a manner that the granular materials in the drying tank 11 are heated and dried. In the embodiment, the drying method is designed in such a manner that the gas dehumidified and heated by passing through the dehumidifying unit 20 and the heating unit 14 is supplied to the drying tank 11 storing the granular materials so as to be circulated, thereby the granular materials are dried. The drying method is executed by controlling each device of the drying apparatus 1 with the control section 41. One embodiment of the drying method of the embodiment is explained referring to FIG. 2 and FIG. 3. In the graph of FIG. 2, the horizontal axis indicates time, the vertical axis indicates temperature, and the "low" side indicates zero degree side. The heater temperature in the graph of FIG. 2 diagrammatically illustrates the transition of the detected value of the temperature sensor 15 provided for the heating unit 14, and the exhaust gas temperature diagrammatically indicates the transition of the detected value of the temperature sensor 17 provided for the exhaust pipe 11b of the drying tank 11. In the time chart of FIG. 2, operation, open or close, and switching of each device are diagrammatically indicated.

When the granular materials are not stored in the drying tank 11, namely material request signals are output from a material sensor, not illustrated in the figure, of the drying tank 11, the primary transportation is executed in such a manner that the granular materials are transported from the material source 3 to the collector 12 of the drying apparatus body 10. When the granular materials are stored in the drying tank 11 to be at a predetermined full level, a drying procedure is executed.

In the drying procedure, under the condition that the valve body 13 of the collector 12 on the upper side of the drying tank 11 and the valve body of the discharge portion 18 at the lower end portion of the drying tank 11 are closed, the heater 14a and the dehumidifying unit 20 are operated and the dehumidified and heated gas is circulated in the drying tank 11. Thus, as illustrated in FIG. 2, after the heater temperature sharply increases toward a previously set temperature, i.e., a preset drying temperature, of the heater 14a, the temperature gradually reaches the preset temperature of the heater 14a.

The preset drying temperature can be a recommended drying temperature, for example from 60 degrees centigrade to 200 degrees centigrade or so, which is predetermined for each granular material. On the other hand, at the initial driving stage of the drying apparatus 1, the granular materials at around a normal temperature, i.e., a room temperature, are stored in the drying tank 11, so that the temperature of the exhausted gas, i.e., the exhaust gas temperature, which passes through a granular material layer and is exhausted from the drying tank 11 changes without largely increasing.

As illustrated in FIG. 3, when the temperature of the granular materials around the gas outlet 16 constituting the heating portion in the drying tank 11 exceeds the glass transition temperature, namely when the first movement condition is satisfied (step 100), the granular materials in the drying tank 11 are moved by the moving mechanism 30 (step 101). As illustrated in FIG. 2, the transport source switching valve 37 is a return side, the suction pipeline switching valve 33 is the primary side, the valve body of the discharge portion 18 is opened, and the transport gas source 31 is operated. Thus, as mentioned above, the granular materials discharged from the discharge portion 18 pass through the collector 12 of the drying apparatus body 10 through the return passages 36, 36A, 38 and are returned to the drying tank 11, thereby the granular materials in the drying tank 11 are moved. The figure exemplifies that ON/OFF of the transportation gas source 31 and OPEN/CLOSE of the valve body of the discharge portion 18 are executed at the same timing; however, any suitable delay time or the like can be set in such a manner that the granular materials do not stay in the return passages 36, 36A, 38. Immediately after the first movement condition is satisfied or after a predetermined delay time (from about 0.1 seconds to 5 seconds or so) passes, a movement procedure can be executed in such a manner that the granular materials in the drying tank 11 are moved by the moving mechanism 30.

When the granular materials on the lower end side region in the drying tank 11 are returned to the upper side, the granular materials heated so as to exceed the glass transition temperature are returned to the upper side, so that the exhaust gas temperature increases temporarily and sharply. After such a rapid increase, the gas introduced from the gas outlet 16 passes through the granular material layer of which temperature is increasing, thus the exhaust gas temperature sharply decreases.

As illustrated in FIG. 3, when the required condition for movement is satisfied (step 102), the granular materials in the drying tank 11 are moved by the moving mechanism 30 the same as mentioned above (step 101). At this time, the same as mentioned above, immediately after the required condition for movement is satisfied or after a predetermined delay time (from 0.1 seconds to 5 seconds or so) passes, the movement procedure can be executed in such a manner that the granular materials in the drying tank 11 are moved by the moving mechanism 30. Or until the movement stop condition is satisfied (step 103), the granular materials in the drying tank 11 are moved by the moving mechanism 30 each time the required condition for movement is satisfied (step 101). Thus, as illustrated in FIG. 2, approximately the same as above, the decreased exhaust gas temperature gradually rises while repeating sharp increasing and sharp decreasing.

When the movement stop condition is satisfied (step 103), the static drying mode is executed in such a manner that the granular materials are dried in a static condition without being moved (step 104). After the movement stop condition is satisfied, the static drying procedure can be executed without executing the movement procedure even when the required condition for movement is satisfied. The figure exemplifies that the static drying mode is executed after movement is executed thirteen times from the initial driving stage of the drying apparatus 1; however, the number is not limited to thirteen. The figure exemplifies that the movement is executed at predetermined intervals from the initial driving stage of the drying apparatus 1; however the embodiment is not limited to such an exemplification.

Completing the drying procedure after the previously set drying time (step 105), the secondary transportation is executed, after the granular materials are stored by the collection device 4 on the side of the supply destination 2, trial and test are suitably executed in the molding machine, being the supply destination 2, and a molding procedure for producing molded products is sequentially executed. When the granular materials are thus consumed in the supply destination 2, the secondary transportation is sequentially executed and the storage level of the granular materials in the drying tank 11 reduces. When material request signals are output from the material sensor, not illustrated in the figure, of the drying tank 11, the primary transportation is executed and the granular materials before drying are introduced or supplied into the drying tank 11. After the granular materials are newly supplied to the drying tank 11, almost the same as mentioned above, when the required condition for movement is satisfied, the movement can be executed.

In the embodiment, the return passages 36, 36A, 38 are provided outside the drying tank 11; in place of such a configuration, they can be provided in the drying tank 11. For example, the drying tank 11 can include a return passage of which suction port opening on the lower end side in the drying tank 11 is provided on the lower end side and of which discharge port opening on the upper side in the drying tank 11 is provided on the upper end side. In such a case, part of the return passage can be provided in the vent pipe of the above-mentioned heating unit 14. Or in place of, or in addition to, the return passages 36, 36A, 38, the transport gas source 31, and the discharge portion 18, the moving mechanism 30 can be provided with a mechanism to stir the granular materials in the drying tank 11, and a gas introduction portion which rapidly increases the pressure in the drying tank 11 by instantaneously introducing gas, or the moving mechanism 30 can be provided with other configurations.

In the embodiment, the heating portion is illustrated as the gas outlet 16 to blow heated gas in the lower end side region in the drying tank 11; in place of, or in addition to such an embodiment, the heating portion can be a heat transmission fin or the like. Specific configurations of each member and each portion of the drying apparatus 1 in the embodiment are not limited to those mentioned above and various modifications are possible. The drying method which is executed using the drying apparatus 1 of the embodiment is not limited to those mentioned above and various modifications are possible. The drying method of the embodiment is executed using the drying apparatus 1 of the embodiment in the above; however, the drying method of the embodiment can be executed using other drying apparatus.

DESCRIPTION OF THE REFERENCE NUMERAL 1 drying apparatus for granular materials
11 drying tank
11a discharge port
14a heater
16 gas outlet (heating portion)
30 moving mechanism
36 upstream-side material transport passage (return passage)
36a branch portion
36A upstream-side return passage (return passage)
36B downstream-side material transport passage (material transport passage)
38 downstream-side return passage (return passage)
41 control section
2 supply destination
A drying system

What is claimed is:

1. A drying apparatus in which granular materials in a drying tank are heated and dried, the drying apparatus comprising:
    a moving mechanism to move the granular materials in the drying tank; and
    a control section to execute a drying procedure in which, with the granular materials stored in the drying tank, the granular materials are dried by blowing gas heated by a heater from a gas outlet provided at a lower region of the drying tank and by exhausting gas passing through a layer of granular materials stored in the drying tank from an exhaust port provided at an upper end portion of the drying tank,
    wherein the control section controls the moving mechanism so as to move the granular materials in the drying tank upon determining that temperature of the granular materials around the gas outlet exceeds a glass transition temperature in the drying procedure.

2. The drying apparatus according to claim 1, wherein the control section controls the moving mechanism so as to move the granular materials when a preset required condition for movement is satisfied after the granular materials are moved by the moving mechanism.

3. The drying apparatus according to claim 2, wherein during execution of a moving and drying mode in which the moving mechanism is controlled to move the granular materials each time the preset required condition for movement is satisfied, when a preset movement stop condition is satisfied, the control section executes a static drying mode in which the granular materials are dried in a static condition.

4. The drying apparatus according to claim 1, wherein the moving mechanism has a return passage to return the granular materials on a lower side in the drying tank to an upper side.

5. The drying apparatus according to claim 4, wherein the control section controls the moving mechanism so as to return 1% to 20% of stored granular materials in the drying tank to the upper side through the return passage.

6. The drying apparatus according to claim 4, wherein the return passage is provided out of the drying tank.

7. The drying apparatus according to claim 6, wherein one end of the return passage is connected so as to communicate with a discharge port at a lower end of the drying tank, an other end of the return passage is connected to the upper side of the drying tank, and a branch portion around a midway of the return passage is connected with a material transport passage to transport the granular materials to a supply destination.

8. A drying method in which granular materials in a drying tank are heated and dried, the method comprising:
    a drying procedure comprising storing the granular materials in the drying tank, drying the granular materials by blowing gas heated by a heater from a gas outlet provided at a lower region of the drying tank and by exhausting gas passing through a layer of the granular materials stored in the drying tank from an exhaust port provided at an upper end portion of the drying tank, wherein the granular materials in the drying tank are moved by a moving mechanism when temperature of the granular materials around the gas outlet exceeds a glass transition temperature in the drying procedure.

9. The drying apparatus according to claim 2, wherein the moving mechanism has a return passage to return the granular materials on a lower side in the drying tank to an upper side.

10. The drying apparatus according to claim 3, wherein the moving mechanism has a return passage to return the granular materials on a lower side in the drying tank to an upper side.

11. The drying apparatus according to claim 5, wherein the return passage is provided out of the drying tank.

12. The drying apparatus according to claim 11, wherein one end of the return passage is connected so as to communicate with a discharge port at a lower end of the drying tank, an other end of the return passage is connected to the upper side of the drying tank, and a branch portion around a midway of the return passage is connected with a material transport passage to transport the granular materials to a supply destination.

13. A drying apparatus in which granular materials in a drying tank are heated and dried, the drying apparatus comprising:

a moving mechanism to move the granular materials in the drying tank, the moving mechanism having a return passage to return the granular materials on a lower side in the drying tank to an upper side in the drying tank; and a control section to control the moving mechanism so as to move the granular materials in the drying tank by returning the granular materials stored on the lower side in the drying tank to the upper side in the drying tank through the return passage upon determining that temperature of the granular materials around a heating portion in the drying tank exceeds a glass transition temperature.

* * * * *